United States Patent [19]

Rezza

[11] Patent Number: 4,776,640
[45] Date of Patent: Oct. 11, 1988

[54] AUXILIARY WHEEL ASSEMBLY FOR MOTOR VEHICLES

[76] Inventor: Marco T. Rezza, 667 E. 237th St., Bronx, N.Y. 10466

[21] Appl. No.: 45,819

[22] Filed: May 4, 1987

[51] Int. Cl.[4] .................. B60B 11/02; B60B 27/02
[52] U.S. Cl. ............................ 301/38 R; 301/405; 301/111
[58] Field of Search ............... 301/38 R, 40 S, 124 R, 301/128, 130, 1, 39 R, 6 R, 90 N, 111, 74, 73, 78, 36 R; 403/1

[56] References Cited

U.S. PATENT DOCUMENTS

| 1,011,852 | 12/1911 | Robertson | 301/38 R |
|---|---|---|---|
| 3,000,673 | 3/1959 | Lansing | 301/128 |
| 4,029,423 | 6/1977 | Sager | 301/111 |
| 4,164,358 | 8/1979 | Entrup | 301/36 R |
| 4,337,003 | 6/1982 | Juhl | 301/128 |

Primary Examiner—Robert B. Reeves
Assistant Examiner—Joseph D. Pape
Attorney, Agent, or Firm—Collard, Roe & Galgano

[57] ABSTRACT

An auxiliary wheel assembly for motor vehicles for attachment to a wheel hub is disclosed herein and includes a spindle, a spindle support which is rigidly fixed to the spindle and which includes an annular baseplate, a tire support rotatably mounted on the spindle, and a tire mounted on the tire support. The annular baseplate also has lug extender elements depending therefrom which are releasably securable and adaptable to different wheel lug patterns.

6 Claims, 6 Drawing Sheets

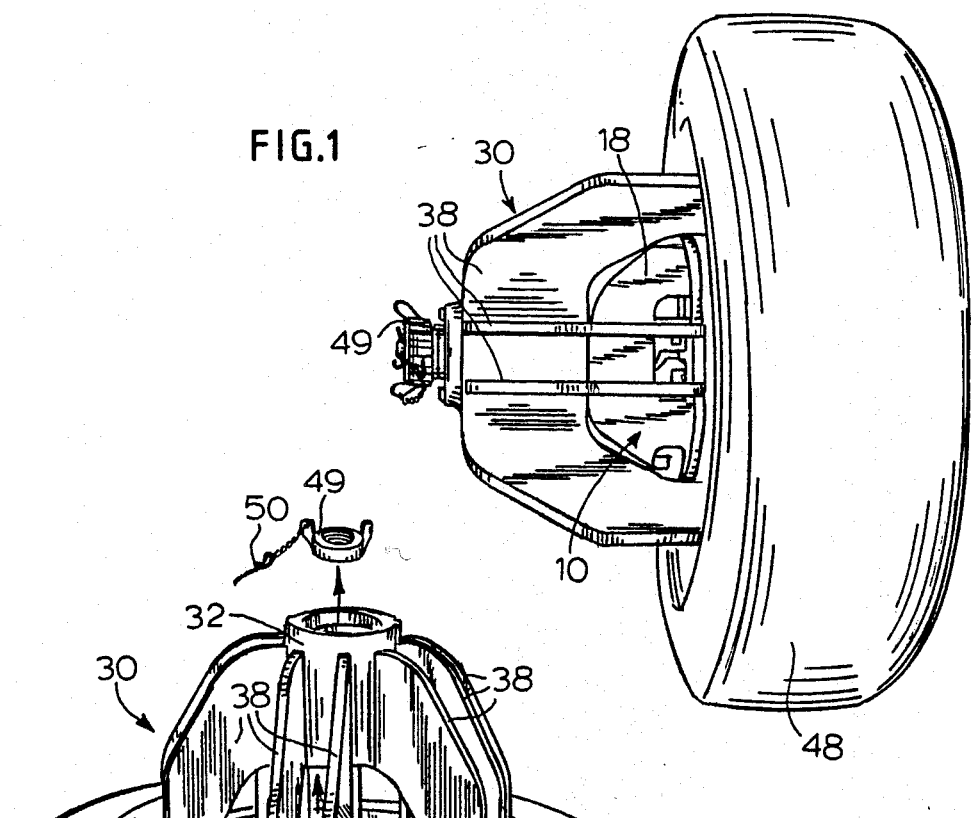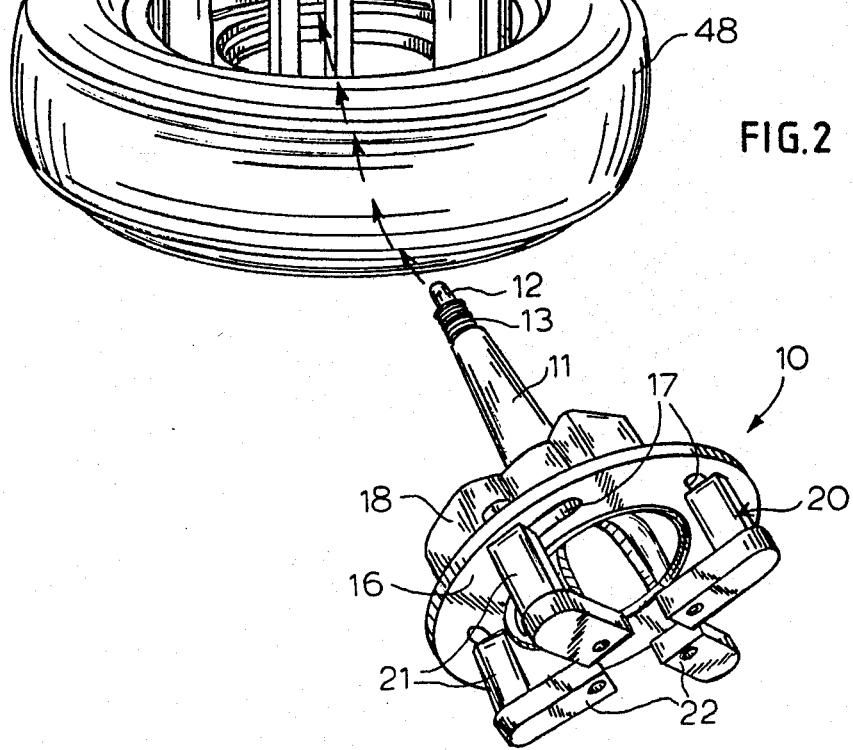

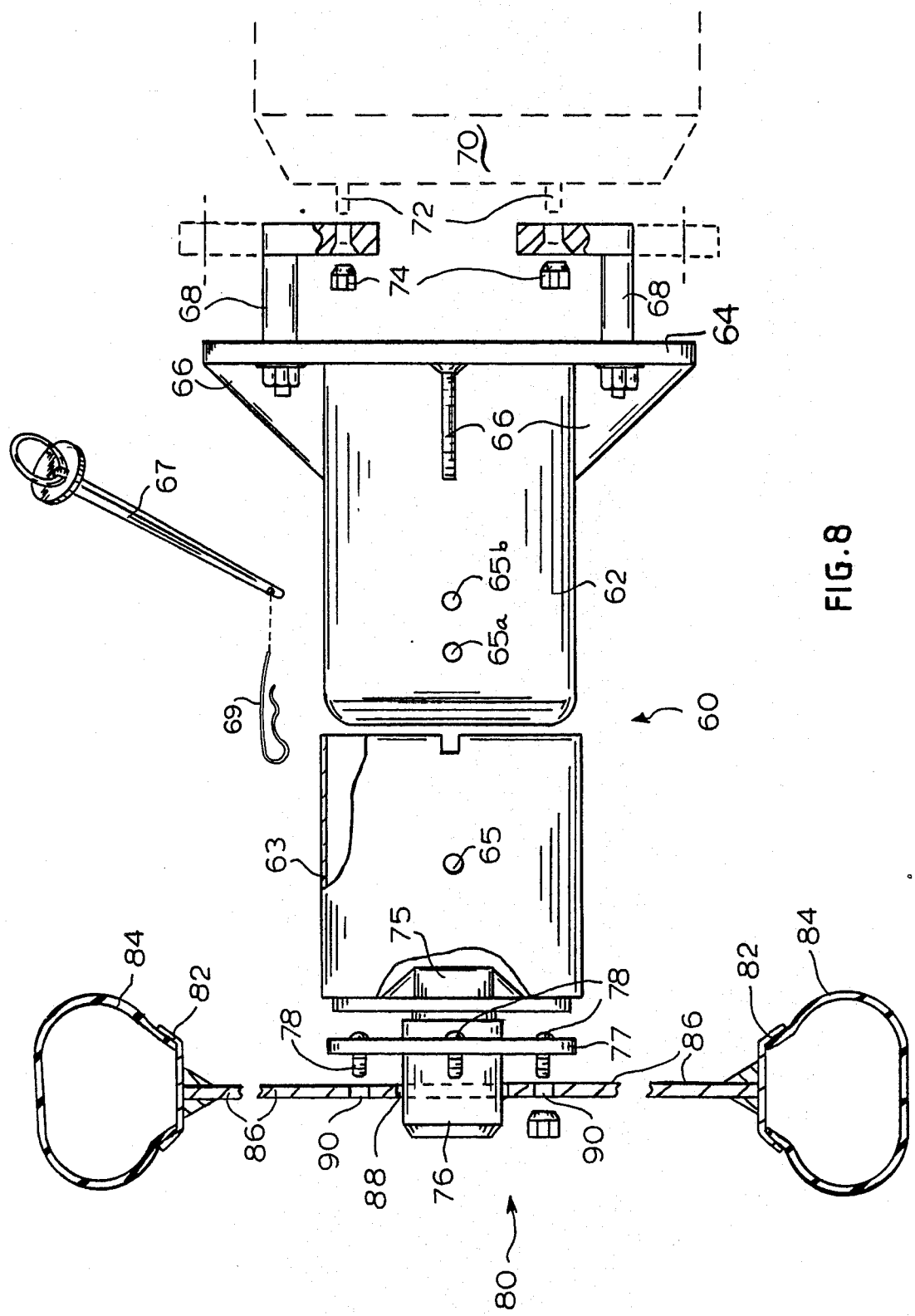

AUXILIARY WHEEL ASSEMBLY FOR MOTOR VEHICLES

BACKGROUND OF THE INVENTION

The present invention relates to an auxiliary wheel assembly for motor vehicles. More particularly, it relates to an auxiliary wheel and tire assembly, especially intended for use by tow truck operators.

Today, when a tow truck operator must move a car missing one or more tires, which is often the case with abandoned cars, he employs auxiliary devices referred to as "dolly wheels" which comprise a pair of interconnected wheeled supports having a trough in which the front or rear hubs of the car are supported. These dolly wheels, which must be installed in pairs, are awkward and time consuming to install, and they limit the speed of the tow vehicle to approximately 20 to 25 miles per hour.

A variety of auxiliary wheels and/or emergency axles for motor vehicles have been proposed to date (see, for example, U.S. Pat. Nos. 2,985,485, 3,454,305, 1,410,863, 1,488,464, 1,278,669, 1,011,852 and 1,383,554). However, so far as is known, no auxiliary wheel assembly is presently available which can be universally adapted to fit all cars, allows towing speeds of normal highway driving speeds (55 miles per hour) and which is easily and quickly installed.

Accordingly, it is an object of the present invention to provide an auxiliary wheel assembly for motor vehicles to be used as emergency equipment which is particularly intended for use by tow truck operators.

It is a further object of the present invention to provide such an auxiliary wheel assembly which is universally adaptable to different wheel lug patterns.

It is a further object of the invention to provide such an auxiliary wheel assembly which is relatively inexpensive to manufacture, easy to install, dependable, and superior in operation with respect to presently available auxiliary wheel devices.

SUMMARY OF THE INVENTION

Certain of the foregoing and related objects are achieved in an auxiliary wheel assembly for motor vehicles for attachment to a wheel hub which comprises a spindle, a spindle support rigidly fixed to the spindle, means for releasably securing the spindle support to a vehicle wheel hub, a tire support rotatably mounted on the spindle, and a tire mounted on the tire support.

Preferably, the spindle support includes an adaptor base plate having openings formed therethrough and lug extender elements adjustably mounted in the openings and releasably securable to the lugs of a wheel hub to provide a rigid fixed securement of the spindle to the hub. Most desirably, the lug extenders are L-shaped to define an upper leg having a free end which it is slidably mountable in one of the base plate openings and is securable in a fixed position therein by means of a nut, and a lower leg having a bore formed therethrough which is dimensioned to receive a lug of a vehicle wheel hub. Advantageously, the base plate is annular and the openings are in the form of slots.

In a preferred embodiment, the spindle support comprises a central hub for supporting the spindle, an annular base plate and a plurality of radially-extending and spaced apart fins joining the central hub to the base plate, with the hub and base plate being laterally displaced but coaxially arranged relative to one another.

Similarly, the tire support preferably comprises a central hub rotatably mountable on the spindle, an annular tire rim on which the tire is mounted and a plurality of radially-extending and spaced-apart fins joining the central hub to the annular tire rim, with the hub and rim being laterally displaced but coaxially arranged relative to one another. It is also deniable that the spindle be tapered.

In a further embodiment of the invention, the spindle support comprises an inner cylindrical base support and an outer cylindrical section telescopically receivable on the base support and means for adjustably fixing the axial postion of the base support and the outer section relative to one another.

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

BRIEF DESCRIPTION OF THE DARWINGS

In the drawings, wherein similar reference characters denote similar elements throughout the several views:

FIG. 1 is a perspective view showing the auxiliary wheel assembly embodying the present invention fully assembled;

FIG. 2 is an exploded view similar to that of FIG. 1 but showing the spindle assembly disengaged from the rotatable tire assembly;

FIG. 8 is a side elevational view, in part section, showing an alternate embodiment of the auxiliary wheel assembly.

DETAILED DESCRIPTION OF THE PREFERRED EMBODIMENT

Figure 3:
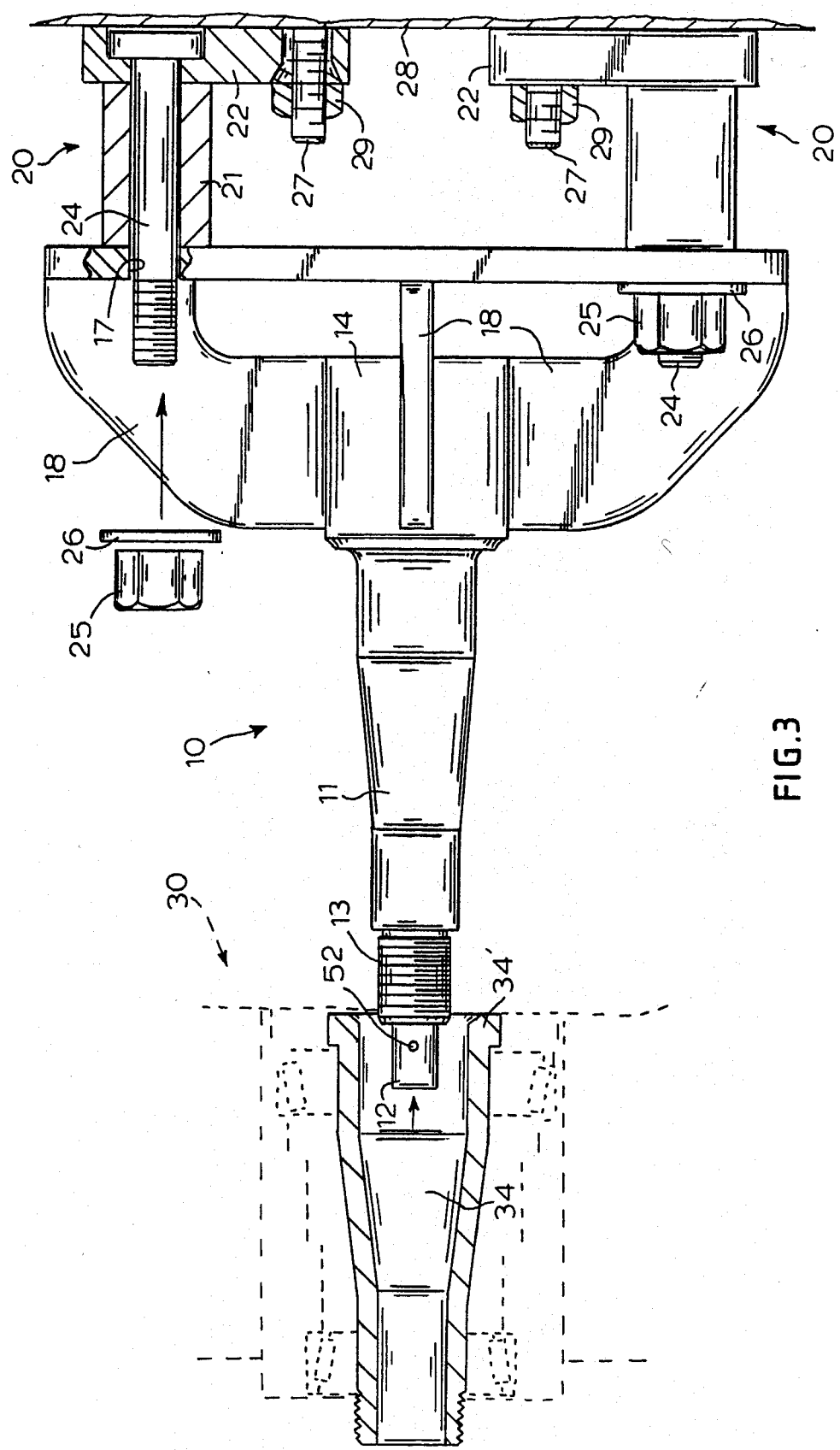
FIG. 3 is a side elevational view of the spindle assembly, in part section and in part exploded view connected to the wheel hub further showing the tire assembly being mounted thereon, in part phantom line.

Turning now in detail to the appended drawings and, in particular, FIGS. 1 and 2, therein illustrated is a novel auxiliary wheel assembly embodying the present invention which includes a spindle subassembly, generally designated by reference numeral 10, which is securable to the lug bolts of a wheel hub (not shown) and a tire subassembly, generally designated by reference numeral 30, which is rotatably supported on the spindle subassembly 10. As can be seen more clearly in FIG. 3, spindle subassembly 10 includes a tapered spindle 11 having a free stub-like end 12 adjacent to which is a threaded portion 13. The opposite end of spindle 11 is secured to a coaxially-arranged hub 14 which, in turn, is secured to a coaxially-disposed, slotted, annular adaptor baseplate 16 via four radially-spaced-apart arcuate fins or support arms 18.

Figure 4:
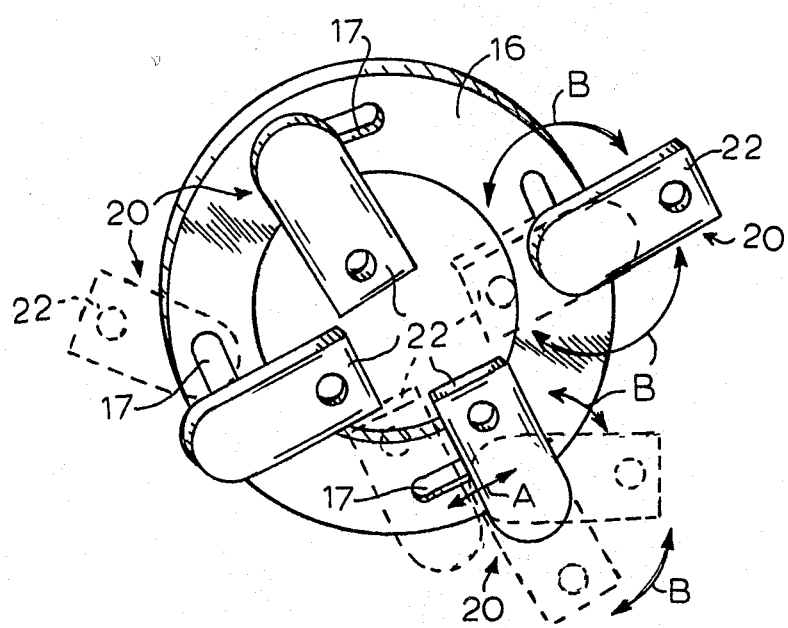
FIG. 4 is a fragmentarily-illustrated, bottom perspective view of the spindle assembly showing the range of movement of the lug extenders in phantom line.
Figure 5:
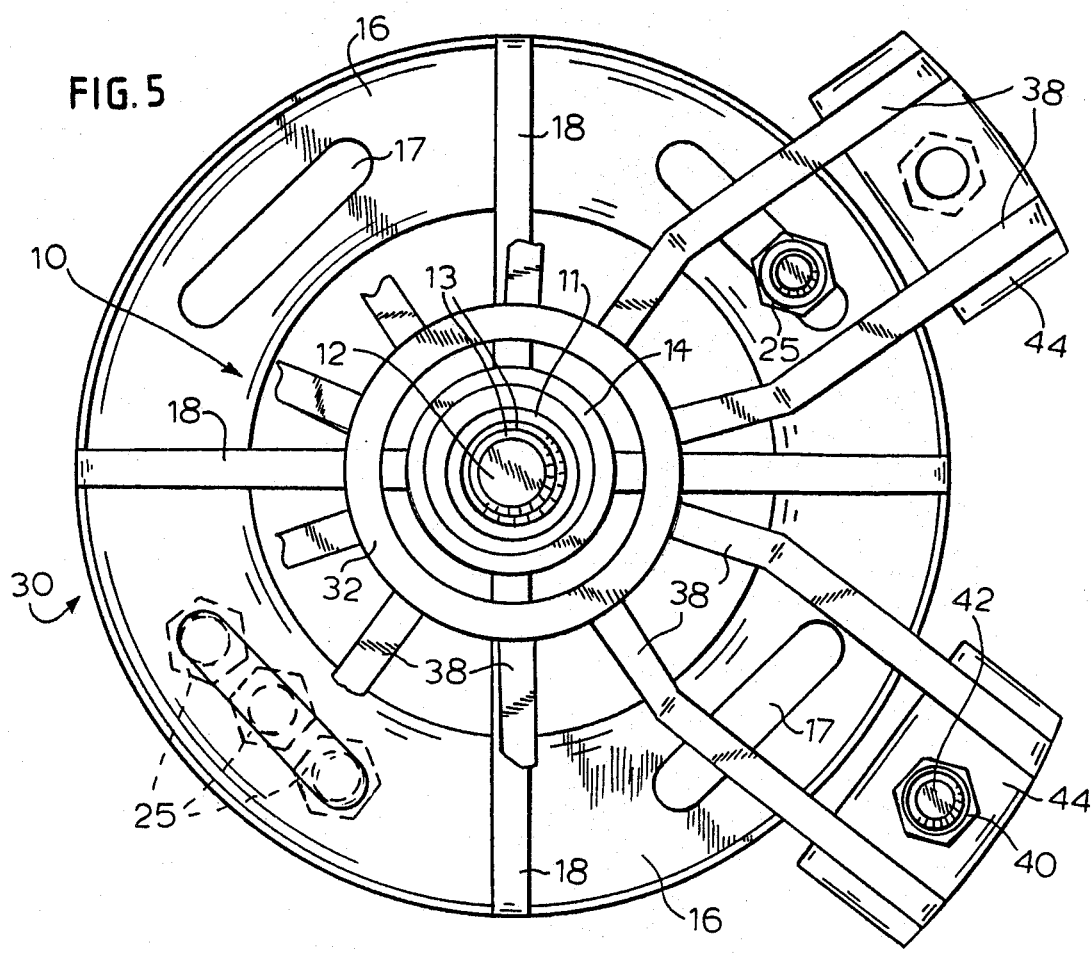
FIG. 5 is a fragmentarily-illustrated front end view of the wheel assembly, showing in phantom line the adjustable positioning of one of the lug extenders.

As seen in FIGS. 3-5, baseplate 16 has four, spaced-apart elongated slots 17 disposed between the fins 18. Associated with each of the elongated slots 17 are L-shaped lug extenders 20 each of which, as shown best in FIG. 3, has an upper leg 21 and a lower leg 22. Upper leg 21 has a coaxially formed through bore for receipt therein of a threaded bolt 24, the threaded free end of which extends through the slot 17 and is fixed therein by means of a nut 25 and washer 26. The lower leg 22 of the L-shaped lug extender 20 is provided with a recessed seat for accommodating the enlarged head of bolt 24 in a substantially flush arrangement thereof with the lower surface thereof. The free end of the lower leg 22 of the lug extender 20 is provided with a through bore for receipt of the lug bolt 27 of a wheel hub 28. A lug nut 29 serves to secure the lower leg 22 of the lug extender 20 to the hub 28.

As shown in FIG. 4, due to the elongated slots 17, it is possible to adjust the lug extenders 20 linearly with respect to the slots' longitudinal axes (arrow A). In addition, it is also possible to rotate the lug extenders 20 about the longitudinal axes of bolts 24 (arrow B) to thereby change the orientation of the lower leg 22 and its associated lug bore. As a result, the lug extenders provide universal adaptability, accommodating any wheel lug bolt pattern or arrangement which typically varies from one car model to the next. When the lug bolts 27 of the wheel hubs 28 are so fastened to the lug extenders 20 and the nuts 25 for bolts 24 of the lug extenders 20 are tightened as well, the spindle 11 will then extend outwardly coaxially relative to the car axle (not shown) or the wheel hub, thereby serving as an auxiliary, emergency or temporary extension thereof. The tire subassembly 30 may then be mounted on the spindle subassembly 10.

Figure 6:
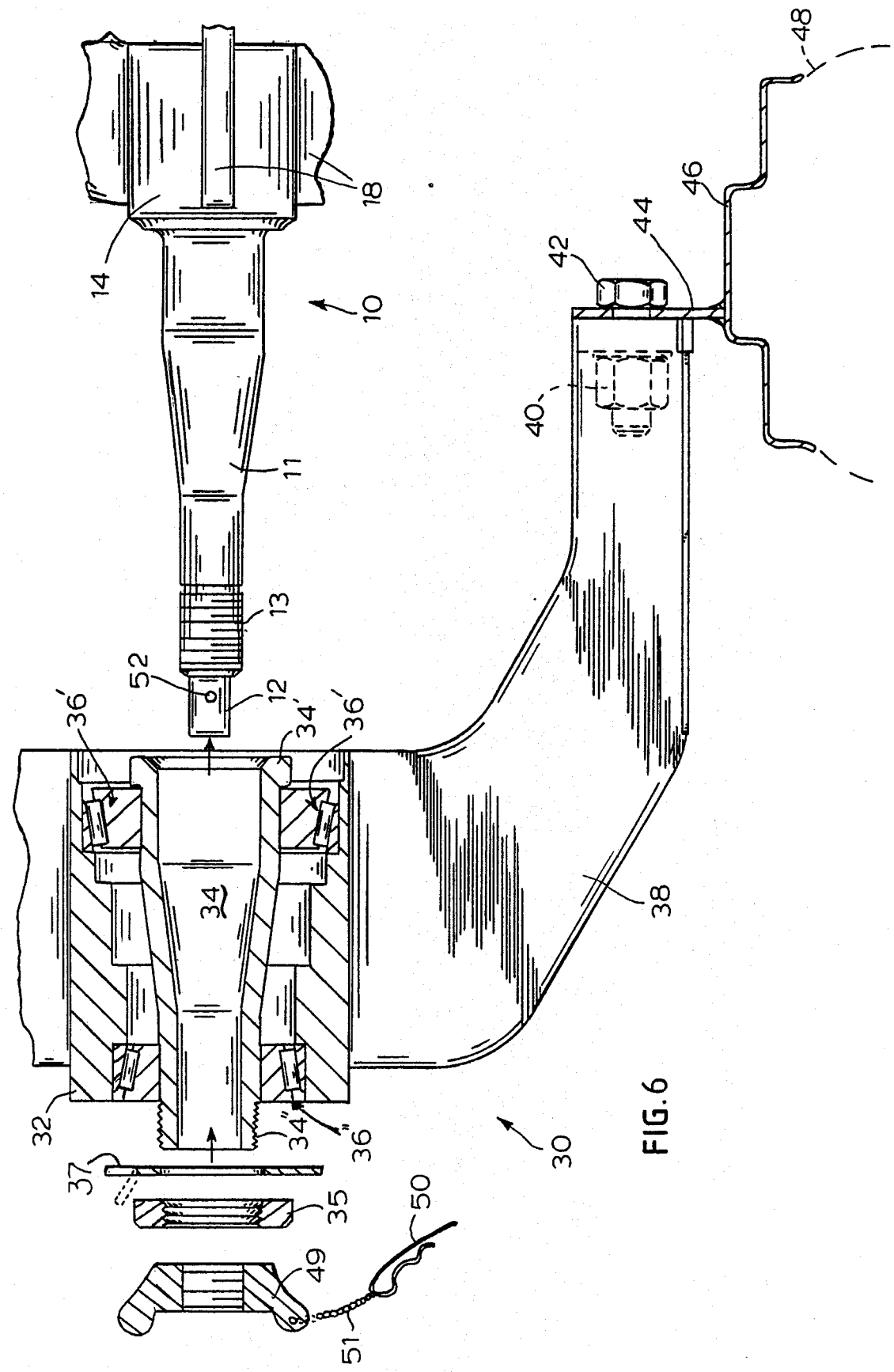
FIG. 6 is a fragmentarily-illustrated exploded side elevational view, in part section, showing the tire assembly being mounted on the spindle assembly.

More particularly, as seen in FIG. 6, the tire subassembly consists of a generally-cylindrical central hub 32 which supports the ends of a spindle sleeve bushing 34 via a pair of bearing assemblies 36', 36'' which allow the hub 32 to rotate freely about sleeve bushing 34. Sleeve bushing 34 is secured to hub 32 via abutment of its rimmed inner end 34' with the inner race of bearing assembly 36' and threaded engagement of its threaded outer end 34'' with nut 35 and washer 37. The outer circumferential surface of hub 32 has four sets of radially-spaced-apart, paired arcuate support fins 38 radiating therefrom which, in a mounted position on the spindle subassembly 10, extend over and are spaced from the fins 18 of the spindle subassembly 10. The free ends of these fins 38 are, in turn, secured via a nut 40 and bolt 42 to a flange 44 of an annular tire rim support 46 which, in turn, supports a tire 48 in a conventional manner.

Sleeve bushing 34 is configured to match and mate with the spindle 11. The tire subassembly 30 is rotatably mounted on spindle 11 of spindle subassembly 10 via sleeve bushing 34. A spin or wing nut 49 is screwed onto the threaded end portion 13 of spindle 11 to hold the tire subassembly 30 in a fixed axial position on spindle 11. To ensure against accidental or unintentional loosening of nut 49, a cotter pin 50 is attached by a chain 51 to nut 49 and one leg thereof is inserted in a snap fit arrangement through a transverse bore 52 in end 12 of spindle 11. Due to its bearing support, hub 32 and, in turn, fins 38 and tire 48 are freely rotatable on spindle 12. The length of the fins 38 and, in general, the configuration and position of the tire subassembly 30 relative to the spindle fins 18 and spindle subassembly 10 are so selected such that the tire 48 assumes a position close to that of the normal tire on the hub inside the wheelhouse or well (not shown).

Figure 7:
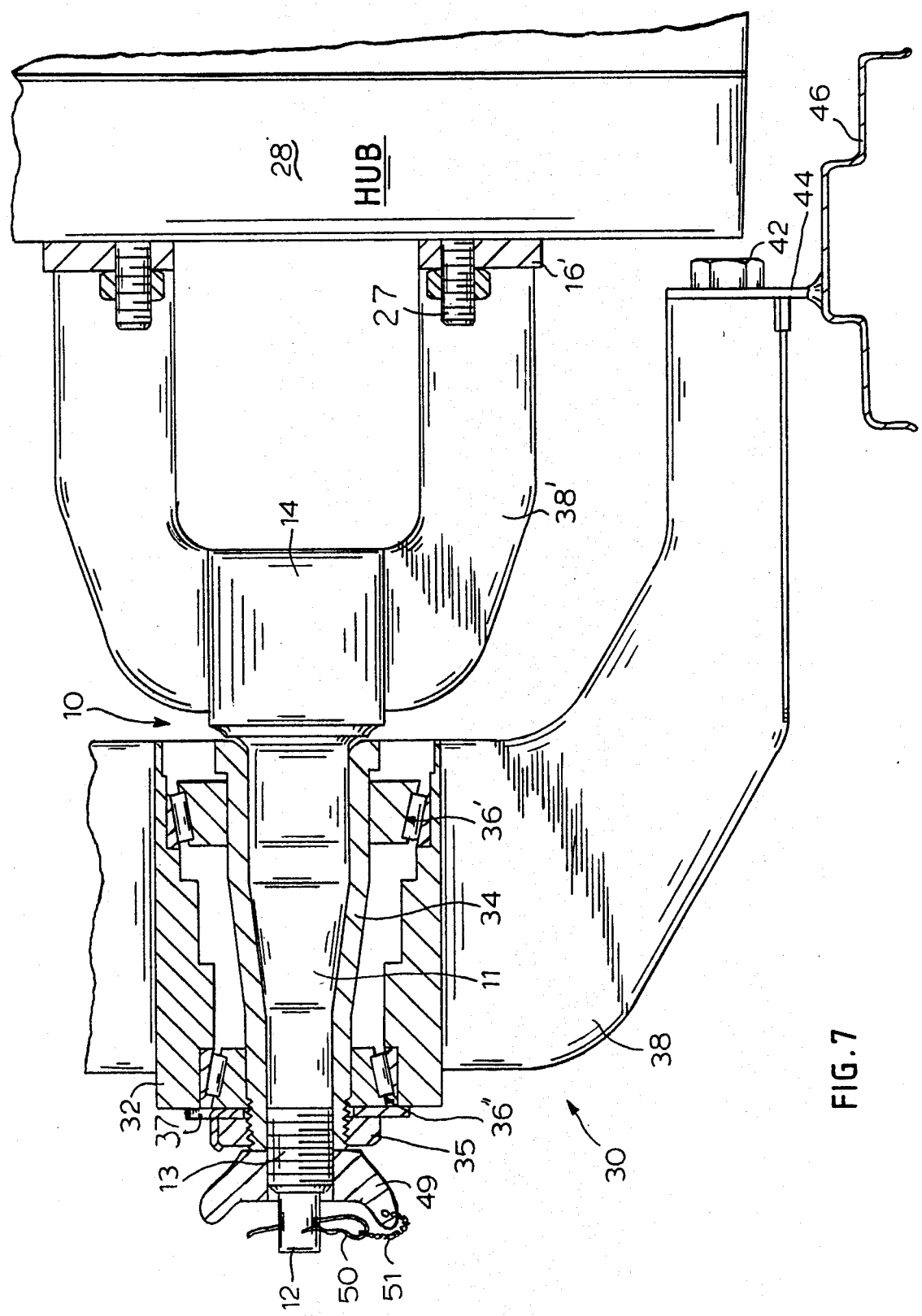
FIG. 7 is a side elevational view similar to that of FIG. 6, but showing the tire assembly fully mounted on a modified spindle assembly which, in turn, is secured to the wheel hub.

FIG. 7 illustrates an alternate embodiment of the invention which is similar in structure and function to the embodiment of FIGS. 1-6 except for the use of slightly modified fins 38' on the spindle subassembly 10' and the omission of the lug extenders 20. In this case, the case plate 16' is fixed directly to the lug bolts 27 of the hub 28. As can be appreciated, the slots in the adaptor base plate 16' afford a certain degree of adaptability themselves in accommodating different lug bolt patterns. The configuration and number of the slots or holes, as well as the configuration of the base plate itself can also be modified to suit a variety of lug bolt patterns, if so desired.

FIG. 8 shows a further alternate embodiment of the invention wherein the tire is intended to be positioned outside of the wheel house or well (not shown) rather than within it, as in the previous embodiments. In this case, the spindle subassembly 60 consists of two telescoping housings—a cylindrical, cup-shaped, inner housing base 62 having a slotted annular base plate 64 secured thereto with the aid of radially spaced-apart fin-like reinforcements 66 and a cylindrical cup-shaped outer section 63 telescopically received thereon. The axial positioning of the outer section 63 to the inner housing base 62 is adjustable as a result of the provision of paired holes 65, 65a, 65b in both sections and a retaining pin 67 having a cooperating cotter pin 69. As can be readily appreciated, the paired holes 65 of outer section is aligned with either of the paired holes 65a or 65b and the pin 67 is then inserted therethrough and then held in place via a conventionl quick-connect or release mechanism (neither of which are shown) or a cotter pin 69 which is inserted into the bore of the pin in a snap-fit manner. As a result of such adjustability, the spindle subassembly can accommodate differently dimensional wheelhouses or wells.

This embodiment is also provided with L-shaped lug extenders 68 which are slidably and rotatably adjustable within the slots (not shown) of the base plate 64 to accommodate a variety of lug bolt patterns and thereby allow and facilitate its securement and that of housing base 62 to wheel hub 70 via lug bolts 72 and lug nuts 74. The outer cylindrical section of the spindle subassembly supports a fixed cylindrical spindle 75 which supports, via bearings (not shown), a rotatable central hub 76 to which is secured an annular flange 77 having spaced-apart bolts 78 mounted thereon. The tire subassembly 80 includes an annular tire rim support 82 to which a tire 84 is conventionally mounted. The tire rim support 82 is welded to a central disc-shaped wheel support 86 which has a central aperture 88 and a series of lug bolt holes 90 to allow the tire subassembly to be placed over hub 76 with its central wheel support 86 fastened to flange 77 via nuts 92 and bolts 78. As a result of such an assembly, the tire 84 is designed to rotate outside of the wheel well, and its distance from the side of the car may be varied by the telescopic adjustment of spindle subassembly 60.

While only several embodiments of the present invention have been described, it is obvious that many changes and modifications may be made thereunto, without departing from the spirit and scope of the invention.

What is claimed is:

1. An auxiliary wheel assembly for motor vehicles for attachment to a wheel hub having a plurality of lugs extending therefrom comprising:
   a spindle;
   a spindle support rigidly fixed to said spindle, said spindle support including
   an annular adaptor baseplate having openings formed therethrough has;
   means for releasably securing said spindle support to the vehicle wheel hub, said means including a plurality of L-shaped lug extender elements adjustably mounted in said baseplate openings and releasably securable to the lugs of the wheel hub to provide a rigid fixed securement of the wheel spindle to said hub, a first leg of each of said L-shaped lug extender elements having a free end for supporting said baseplate a predetermined distance from the wheel hub, said free end having a threaded portion extending therefrom slidably mountable in one of said baseplate openings and securable in a fixed position therein by means of a nut, and a second leg of each of said L-shaped lug extender elements having a bore formed therethrough which is dimensioned to receive one of the lugs of the vehicle wheel hub;
   a tire support rotatably mounted on said spindle; and
   a tire mounted on said tire support.

2. The assembly of claim 1, wherein said baseplate openings are in the form of slots.

3. The assembly of claim 1, wherein said spindle support comprises a hub coaxially-arranged with said spindle for the support thereof, said annular adapter baseplate and a plurality of radially-extending and spaced apart fins joining said hub to said baseplate, said hub and said baseplate being laterally displaced but coaxially arranged relative to one another.

4. The assembly of claim 1, wherein said tire support comprises a central hub rotatably mountable on said spindle, an annular tire rim on which said tire is mounted and a plurality of radially-extending and spaced-apart fins joining said central hub to said annular tire rim, said hub and rim being laterally displaced but coaxially arranged relative to one another.

5. The assembly of claim 1, wherein said spindle is tapered.

6. The assembly of claim 1, wherein said spindle support comprises an inner cylindrical base support and an outer cylindrical section telescopically receivable on said base support and means for adjustably fixing the axial position of said base support and said outer section relative to one another.

* * * * *